No. 680,654.  
G. W. GOMBER.  
RUBBER GEARING.  
(Application filed June 6, 1900.)  
(No Model.)
Patented Aug. 13, 1901.
Fig. 1.  Fig. 3.  Fig. 2.
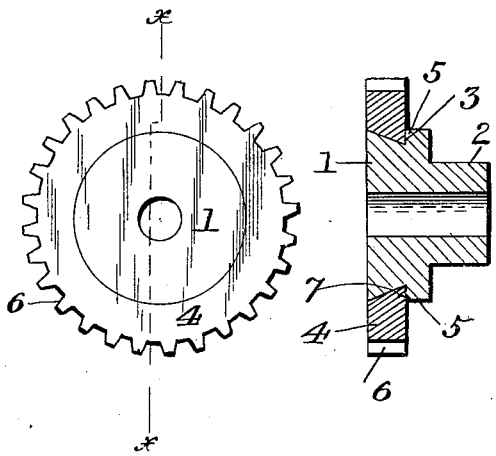
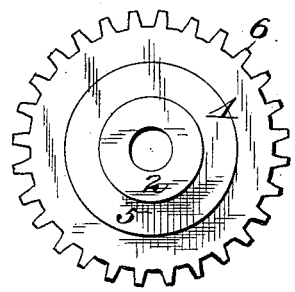
WITNESSES:
J. L. Ouraud
Geo. Hilton
INVENTOR
George W. Gomber.
BY
ATTORNEYS.
THE NORRIS PETERS CO., PHOTO-LITHO., WASHINGTON, D. C.

UNITED STATES PATENT OFFICE.

GEORGE W. GOMBER, OF CONYNGHAM, PENNSYLVANIA, ASSIGNOR, BY MESNE ASSIGNMENTS, TO THE AMERICAN MULTIPLEX TALKING MACHINE COMPANY, OF WEST VIRGINIA.

RUBBER GEARING.

SPECIFICATION forming part of Letters Patent No. 680,654, dated August 13, 1901.

Application filed June 6, 1900. Serial No. 19,279. (No model.)

*To all whom it may concern:*

Be it known that I, GEORGE W. GOMBER, (post-office address Conyngham, Luzerne county, Pennsylvania,) a citizen of the United States, residing at Conyngham, in the county of Luzerne and State of Pennsylvania, have invented certain new and useful Improvements in Rubber Gearing for Talking-Machines, &c.; and I do hereby declare the following to be a full, clear, and exact description of the invention, such as will enable others skilled in the art to which it appertains to make and use the same.

My invention relates to the construction of gear wheels or pinions; and my object is to provide that the contact of one gear-wheel with another will be wholly noiseless.

With this object in view I have produced a certain novel combination and construction of parts, as will be hereinafter fully described and the preferred materialization thereof covered in the claims.

I shall not attempt in this application to illustrate all of the various materializations possible, inasmuch as the idea may be exemplified in other ways than herein shown, and I therefore desire to comprehend all substantial equivalents and substitutes of the forms of construction and combination presented.

In the accompanying drawings, Figure 1 is a side view of my improved gear-wheel complete. Fig. 2 shows the reverse side thereof. Fig. 3 is a vertical section of Fig. 1 on line *x x*.

Briefly stated, my invention consists in forming the teeth of my improved gear-wheel of some suitable sound-absorbing material, as stiffened or semivulcanized rubber or the equivalent, and in order to insure that the wheel will possess sufficient rigidity to perform its office and to enable the wheel to be attached to its shaft I provide the hub or central section 1, which may have a central bore adapted to receive the shaft, it being understood that said hub may be provided with a suitable flange 2, adapted to accommodate a set-screw, and thus insure that the wheel may be readily adjusted and secured in its operative position, though it is obvious that a key as commonly employed may be used in place of the set-screw. The peripheral face of the hub, as will be seen by reference to Fig. 3, is provided with a continuous groove 3, which is preferably formed as shown in said view, the bottom of the groove being inclined inward, and since the rim 4 is so shaped upon its inner edge that it will exactly fit the groove 3 it follows that said rim may be easily slipped in place upon the hub, where it will be held by its own resiliency.

By providing that the groove 3 shall be inwardly directed it will be seen that the inner wall of the groove is substantially vertical, thus providing a shoulder 5, against which the rim will naturally seat itself, and consequently will press against the retaining-points on said flange, whereby the rubber rim will be held securely in place. The peripheral face of the rim 4 carries the teeth 6, which may be integrally formed with the rim of some such substance as rubber. It is thought that the rim will reliably remain in an adjusted position within the groove 3 without any reinforcement, though if deemed desirable any preferred variety of adhesive substance or cement may be employed.

If desired, a plurality of retaining-points 7 may be provided upon the inner face of the shoulder 5, said points being designed to take into the yielding substance forming the rim, and thus prevent said rim from slipping upon the hub.

In practice it will not be necessary that both meshing gears shall be constructed after the manner herein described, as one of the gears may be as now commonly constructed or wholly of metal and my improved gear-wheel placed in coöperation therewith, and it will be found that as the rubber cogs are used in connection with the metallic cogs a film of metal, dust, &c., the products of wear, will adhere to the surface of the rubber cogs, and thereby render them more durable. It is thought, therefore, that better results will follow where my improved cog-wheel is employed in connection with a metallic cog-wheel.

While it is thought that better results may be obtained from the use of rubber properly stiffened, though not in a rigid set condition, yet, if desired, hard rubber or a rim of wood may be used, inasmuch as said material will be found to posses great capacity for absorbing sound. My improved gearing will be found especially desirable for use upon phonographs, kinetoscopes, and in other situations where it is important to eliminate the sound caused by the driving mechanism and other parts.

Having thus described my invention, what I claim as new, and desire to secure by Letters Patent, is—

1. A gear-wheel comprising a central core having a peripheral groove with a laterally-inclined bottom and a non-resonant rim fitting said groove, as set forth.

2. A gear-wheel comprising a central core having a peripheral groove with a laterally-inclined bottom, a non-resonant rim fitting said groove and means to lock the rim in place carried by the flange of the wheel on one side of said groove as set forth.

3. A gear-wheel comprising a central core having a peripheral groove with a laterally-inclined bottom, a non-resonant rim fitting said groove and spurs to lock the rim in place carried by the flange of the wheel on one side of said groove as set forth.

In testimony whereof I affix my signature in presence of two witnesses.

GEORGE W. GOMBER.

Witnesses:
E. R. DRUM,
HARRY F. GOMBER.